United States Patent Office 3,033,832
Patented May 8, 1962

3,033,832
HALOGENATION OF RUBBERY COPOLYMERS
George E. Serniuk, Roselle, and Irving Kuntz, Roselle
Park, N.J., assignors to Esso Research and Engineering
Company, a corporation of Delaware
No Drawing. Filed Mar. 7, 1958, Ser. No. 719,725
9 Claims. (Cl. 260—78.4)

This invention relates to the preparation of high molecular weight, halogen and oxygen-containing rubbery copolymers of isoolefins and multiolefins, and particularly halogenated isoolefin-multiolefin copolymers of high halogen content produced by halogenation in the presence of halogen containing compounds and in the presence of certain organic acid anhydrides.

Heretofore, it has been impossible to produce butyl rubber copolymers, with or without chemical modification, which are of high halogen content without, at the same time, degrading the molecular weight. The desirability of such high molecular weight butyl rubber copolymers of high halogen content is apparent inasmuch as they would be readily vulcanizable or covulcanizable with other highly unsaturated rubbery polymers such as natural rubber or rubbery diene-styrene copolymers into materials exhibiting a combination of high extension modulus and improved electrical resistivity.

In accordance with the present invention, it has now been discovered that isoolefin-multiolefin rubbery copolymers such as butyl rubber may be halogenated to a high halogen content without molecular weight degradation provided the halogenation is conducted while the rubbery copoymer is dissolved in a halogenated solvent and in the presence of about 0.1 to 20, preferably about 0.5 to 5.0 moles of a $C_3$ to $C_{30}$ unsaturated organic acid anhydride per mole of added halogen. The ratio of halogenation agent to total halogenated solvent is normally about 2:1 to 1:1,000 and preferably about 1:1 to 1:500, the halogenation conditions being regulated to combine with the butyl rubber copolymer about 0.1 to 30 weight percent, advantageously about 2.0 to 15 weight percent, and preferably about 3.0 to 10.0 weight percent of halogen.

In order to halogenate the rubber copolymer to the extent above-mentioned, the halogenating temperatures are generally about −50° C. to +200° C., preferably about 0° C. to +150° C. for a few minutes to several hours or more (e.g. 3 minutes to 10 days) depending upon the particular halogen, copolymer molecular weight, type and amount of organic acid anhydride, temperature, pressure, etc. Suitable pressures are about 0.1 to 500 p.s.i.a., although this is not particularly critical, atmospheric pressure being satisfactory. The preferred halogens are chlorine or bromine.

Butyl rubber copolymers comprise a major proportion (preferably about 85.0 to 99.5 weight percent) of a $C_4$ to $C_8$ isoolefin such as isobutylene, 2-methyl-1-butene or 3-methyl-1-butene, etc., with a minor proportion (preferably about 15 to 0.5 weight percent) of a multiolefin of about 4 to 14, preferably of about 4 to 6 carbon atoms and are commonly referred to in patents and technical literature as "butyl rubber," or GR–I rubber (Government Rubber-Isobutylene), for example in textbook "Synthetic Rubber" by G. S. Whitby. The preparation of butyl rubber is described in U.S. Patent 2,356,128 to Thomas et al. The multiolefinic component of the copolymer is preferably a conjugated diolefin such as isoprene, butadiene, dimethylbutadiene, piperylene, or such multiolefins, as cyclopentadiene, myrcene, dimethallyl, allo-ocimene, vinyl fulvenes, etc. The copolymer comprising isobutylene and isoprene is preferred, although the copolymer may contain about 0.05 to 20.0, preferably about 0.2 to 5.0, parts by weight based on total reacting comonomers of such monoolefinic compounds as styrene, p-methylstyrene, alpha-methylstyrene, indene, dihydronaphthalene, dichlorostyrene, p-chlorostyrene, mixtures thereof, etc. Such a copolymer has a Staudinger molecular weight between about 20,000 and 300,000, or a viscosity average molecular weight of about 250,000 to 2,000,000 and an iodine number between about 0.5 and 50.

Suitable halogenating agents which may be employed are gaseous chlorine, liquid bromine, alkali metal hypochlorites or hypobromites, $C_4$ to $C_{10}$ tertiary alkyl hypochlorites or hypobromites, sulfur bromides or chlorides (particularly sulfuryl bromide or chloride), N-chlorosuccinimide, N-bromosuccinimide, alpha-bromo or chloro acetanilide, N,N'-dibromo-5,5-dimethylhydantoin, tribromophenol bromide, N-chloro-acetamide, N-bromophthalimide, iodine monochloride, etc.

The modification reaction may be accomplished preferably by preparing a 1 to 80 weight percent solution of such copolymers as above in a $C_1$ to $C_{10}$ halogenated liquid organic solvent such as chloroform, bromo-trichloro methane, chloro-tribromo methane, carbon tetrachloride, dichloro dibromo methane, mixtures thereof, etc., and adding thereto the organic acid anhydride and the halogenating agent, which may optionally be in solution, such as dissolved in a halogenated liquid organic solvent.

It is preferred to employ as the acid anhydride a $C_4$ to $C_{20}$ unsaturated polybasic acid anhydride and especially a $C_4$ to $C_{16}$ unsaturated monoolefinic dibasic acid anhydride. Suitable acid anhydrides, for the purposes of the present invention, include among others; maleic acid anhydride; chloromaleic acid anhydride; citraconic acid anhydride; itaconic acid anhydride; dihydro phthalic acid anhydride; 3,6-endo methylene-delta$^4$-tetrahydro phthalic acid anhydride; mesaconic acid anhydride, isopropyl itaconic acid anhydride, dimethyl maleic acid anhydride, glutaconic acid anhydride, muconic acid anhydride, etc.

The resulting modified isoolefin-multiolefin-containing copolymer, may be recovered by precipitation with oxygenated hydrocarbons, particularly alcohols or ketones such as acetone or any other known non-solvent for the rubbery copolymer and dried under about 0.1 to 760 millimeters or higher of mercury pressure absolute at about 0° to 180° C., preferably about 50° to 150° C. (e.g., 60° C.). Other methods of recovering the modified polymer are by conventional spray or drum drying techniques. Alternatively, the solution of modified butyl rubber may be injected into a vessel containing steam and/or agitated water heated to a temperature sufficient to volatilize the solvent and form an aqueous slurry of the modified butyl rubber. This modified butyl rubber may then be separated from the slurry by filtration and drying and recovered as a "crumb" or as a dense sheet or slab by conventional hot milling and/or extruding procedures. As so produced the modified rubbery copolymer has a Staudinger molecular weight within the range of approximately 20,000 to 300,000, preferably about 25,000 to 200,000, and an iodine number of about 0.5 to 5.0. The unvulcanized modified reaction products formed are then vulcanized advantageously in the presence of about 0.5 to 5 parts by weight of sulfur and about 1 to 10 parts by weight of zinc oxide per 100 parts by weight of modified rubbery copolymer under vulcanization temperatures of between about 250° and 450° F. for several minutes up to 5 hours or more depending upon the state of cure desired. Alternatively, the resulting halogenated copolymer may be vulcanized by means of conventional quantities of such materials as polyvalent metal oxides, organic amines, zinc oxide in conjunction with amines, diisothiocyanates, quinone dioxime and its derivatives with the optional presence of such accelerators as benzothiazyl disulfide, mercaptobenzothiazole or in the presence of added ultra type accelerators such as tetra alkyl thiuram sulfides, metal polyalkylthiocarbamates, etc. Normally the cure is effected for about five minutes to three hours at temperatures of between about 270° and 350° F. The resulting modified reaction products formed have utility as rubber insulation, in air springs, hosing, curing bladders, belting, proofed goods, tire treads and tire bead areas, etc.

In order to more fully illustrate the present invention, the following experimental data are given.

*Example I*

100 grams of a butyl rubber copolymer having a viscosity average molecular weight of 340,000, a Mooney viscosity (212° F. for 8 minutes) of 43 and an iodine number of 15.4 corresponding to a mole percent unsaturation of 2.26 was dissolved in 1,000 milliliters of carbon tetrachloride. This solution was heated to 40° C. and 30 grams of diatomaceous earth (Hy-Flo) were added thereto. Stirring was continued for 15 minutes at 40° C., the solution being subsequently filtered to remove the diatomaceous earth and adsorbed impurities thereon. The resulting filtered solution was charged to a 3-liter 3-neck round bottom flask fitted with a mechanical stirrer, reflux condenser and thermometer. To this solution were added 4.0 grams of maleic anhydride dissolved in 50 ml. of carbon tetrachloride, the solution formed being stirred at 28° C. for 30 minutes. Following this, a solution of 2.64 grams of chlorine in 200 milliliters of cold carbon tetrachloride was injected into the polymer solution dropwise at 25° C. over a period of ½ hour, the reaction mixture being continuously stirred throughout and for one hour after all the chlorine was added. The modified product formed was then isolated by a multiple solution-precipitation technique using benzene as the solvent and acetone as the anti-solvent for three times. Residual solvents were then stripped from the modified product by heating for 16 hours at 60° C. under 240 millimeters of mercury pressure absolute. The resulting modified product showed the following analysis:

| | Weight percent |
|---|---|
| Oxygen | 0.39 |
| Chlorine | 2.15 |
| Carbon | 83.40 |
| Hydrogen | 14.15 |

The halogen content of the reaction product after halogenation in the absence of maleic anhydride was found to be only 1.3 weight percent chlorine using the foregoing reaction conditions. This proves that higher concentrations of combined halogen are permissible when halogenating in the presence of organic acid anhydrides in accordance with the present invention.

*Example II*

The same general procedure as in Example I was repeated except that at the end of the chlorination step, the reaction mixture was contacted with 100 milliliters of water for ½ hour before isolation of the product. The modified product formed showed the following analysis:

| | Weight percent |
|---|---|
| Oxygen | 0.23 |
| Chlorine | 1.75 |
| Carbon | 84.51 |
| Hydrogen | 14.07 |

*Example III*

Example I was repeated in all respects except that the chlorine solution was added to the polymer solution at 45° C., during 40 minutes, and after all of the chlorine was delivered the reaction mixture was heated for 2 hours at 75° C. The purified product showed the following composition:

| | Weight percent |
|---|---|
| Oxygen | 0.24 |
| Chlorine | 4.50 |
| Carbon | 81.60 |
| Hydrogen | 13.60 |

*Example IV*

Example III was repeated in all respects except that 11.15 grams of maleic anhydride were used. The product analyzed as follows:

| | Weight percent |
|---|---|
| Oxygen | 0.79 |
| Chlorine | 4.75 |
| Carbon | 80.70 |
| Hydrogen | 13.75 |

*Example V*

The products from Examples I and II were compounded as follows:

| Component: | Parts by weight |
|---|---|
| Maleic anhydride modified halogenated butyl rubber | 100 |
| SRF carbon black (Pelletex) | 50 |
| Zinc oxide | 5 |
| Stearic acid | 0.5 |
| Benzothiazyl disulfide | 1.0 |
| Sulfur | 2.0 |
| Diortho tolyl guanidine | 0.1 |

The resulting compounded stocks were cured for 60 minutes at 300° F. and their physical properties compared with those of unmodified Butyl rubber copolymers and a Butyl rubber copolymer halogenated in the absence of maleic anhydride under the same general conditions as given above, all compositions being similarly compounded and cured. The results were as follows:

| | Property | |
|---|---|---|
| Sample | Tensile Strength (p.s.i.) | Modulus at 300% Elong. (p.s.i.) |
| From Example I (2.15% Cl) | 1,925 | 1,250 |
| From Example II (1.75% Cl) | 1,935 | 1,100 |
| Unmodified Polymer (0.00% Cl) | 1,645 | 550 |
| Halogenated Polymer (1.3% Cl) | 2,000 | 550 |

The above data show that butyl rubber halogenated in the presence of an unsaturated organic acid anhydride and employing a halogenated solvent results in higher final chlorine content of the modified rubbery copolymer formed and that the modulus of such modified copolymer, upon subsequent vulcanization, is approximately twice as high as that for an unmodified butyl rubber copolymer or a butyl rubber copolymer halogenated in the absence of an unsaturated organic acid anhydride plus a halogenated solvent. It will also be noted that the final polymer contains oxygen in addition to halogen, carbon and hydrogen.

*Example VI*

The same general procedure as in Example I was repeated and the product compounded as follows:

| Component: | Parts by weight |
|---|---|
| Unsaturated anhydride modified halogenated butyl rubber | 100 |
| SRF carbon black (Pelletex) | 50 |
| Zinc oxide | 5.0 |
| Stearic acid | 0.5 |
| Tetramethyl thiuram disulfide | 1.0 |

The resulting compounded stock was cured at 300° F. for 60 minutes and compared to both a non-modified butyl rubber copolymer and a butyl rubber copolymer halogenated in the absence of an unsaturated anhydride. All polymers were similarly compounded and cured under the conditions given above with the following results:

| Sample | Property | |
|---|---|---|
| | Tensile Strength (p.s.i.) | Modulus at 100% Elong. (p.s.i.) |
| From Example VI (2.15% Cl) | 1,645 | 700 |
| Unmodified Polymer (0.00% Cl) | No cure | |
| Halogenated Polymer (1.3% Cl) | 1,720 | 250 |

*Example VII*

The products from Examples III and IV as well as an unmodified polymer and a polymer halogenated in the absence of an unsaturated anhydride and a halogen containing compound were compounded as follows:

Component:                     Parts by weight
  Rubber _____ 100
  SRF carbon black (Pelletex) _____ 50
  Stearic acid _____ 1.0
  Zinc oxide _____ 5.0
  Sulfur _____ 2.0
  Benzothiazyl disulfide _____ 1.0
  Diortho tolyl guanidine _____ 0.1

All compounds were cured for 60 minutes at 300° F. with the following evaluation:

| Sample | Property | |
|---|---|---|
| | Tensile Strength (p.s.i.) | Modulus at 100% Elong. (p.s.i.) |
| Unmodified polymer (0.00% Cl) | 1,645 | 550 |
| Halogenated polymer (1.3% Cl) | 2,000 | 550 |
| From Example III (4.50% Cl) | 1,976 | 1,793 |
| From Example IV (4.75% Cl) | 1,992 | 1,696 |

The above data show that by effecting the halogenation of butyl rubber in the presence of an acid anhydride in a halogenated solvent, a product can be obtained which contains oxygen and chlorine in addition to carbon and hydrogen. It is also indicated that by halogenating butyl in this manner more halogen can be incorporated into the polymer without polymer breakdown than can be incorporated when the polymer is halogenated directly. The data also show that polymers containing the elements oxygen and halogen give vulcanizates with high moduli and tensile values.

*Example VIII*

One hundred grams of the unmodified butyl rubber copolymer used in Example I were dissolved in 1,000 milliliters of carbon tetrachloride and the solution treated with 30 grams of Hy-Flo and filtered as in Example I. To the resulting clear polymer solution was then added 16.05 grams of chloromaleic anhydride and the resulting admixture charged to a 2-liter 4-way reaction flask equipped with a mechanical stirrer, thermometer, reflux condenser, and delivery funnel. Chlorine, 2.87 g. dissolved in 250 ml. of carbon tetrachloride, was added to the dropping funnel, and the solution was delivered to the reaction mixture, which was heated to 40–45° C., over a period of one hour. The reaction temperature was then raised to the reflux temperature of the solvent and the reaction mixture was contacted at this temperature for two hours. The reaction mixture, after standing at room temperature overnight, was isolated by a multiple solution-precipitation technique using benzene as the solvent and acetone as an anti-solvent. Three solutions and precipitations were effected. The residual solvents were stripped from the polymer by heating for 16 hours at 60° C. at 180 Torr.

The product was compounded as follows:

Component:                     Parts by weight
  Polymer _____ 100
  MPC carbon black (Kosmobile 66) _____ 50
  Stearic acid _____ 1
  Zinc oxide _____ 5
  Sulfur _____ 2
  Tellurium diethyl dithiocarbamate (Tellurac) __ 1

The compound was cured for 60 minutes at 307° F. The vulcanizate properties of this product are compared with an unmodified butyl rubber similarly compounded and cured in the table of data which follows:

| Vulcanizate | Physical Properties | | |
|---|---|---|---|
| | Modulus at 300% Extension (p.s.i.) | Tensile Strength (p.s.i.) | Electrical Resistivity, ohm-cm. |
| Unmodified polymer | 1,050 | 2,850 | $4.95 \times 10^8$ |
| Product of Example VIII | 2,000 | 2,895 | $1.53 \times 10^{13}$ |

The product of Example VIII showed a substantial increase in modulus over the unmodified polymer. The substantial improvement shown by the product in electrical resistivity indicates that this type of modification yields a product which shows a better interaction with carbon blacks.

*Example IX*

Example VIII was repeated with the exception that citraconic anhydride (14.6 g.) was used in place of chloromaleic anhydride. The purified product analyzed as follows:

Weight percent
Oxygen _____ 0.25
Chlorine _____ 1.62

This product, after being compounded and cured according to the recipe given in Example VIII, showed the following properties:

| Vulcanizate | Physical Properties | | |
|---|---|---|---|
| | Modulus at 300% Extension (p.s.i.) | Tensile Strength (p.s.i.) | Electrical Resistivity, ohm-cm. |
| Unmodified polymer | 1,050 | 2,850 | $4.95 \times 10^8$ |
| Product of Example IX | 2,060 | 2,730 | $2.51 \times 10^{12}$ |

The same general comments apply to the results obtained in Example IX above as were given in Example VIII.

Resort may be had to modifications and variations of the disclosed embodiments without departing from the spirit of the invention or the scope of the appended claims.

What is claimed is:

1. A composition formed by reacting at a temperature of −50° C. to +200° C. a copolymer of 85 to 99.5 wt. percent of a $C_4$ to $C_8$ isoolefin and 0.5 to 15 wt. percent of a $C_4$ to $C_{14}$ multiolefin; with a halogenating agent capable by itself of incorporating halogen only, within said copolymer, said halogenating agent being present in an amount sufficient to combine about 0.1 to 30 wt. percent (based on copolymer) of halogen in said copolymer; in the presence of a $C_4$ to $C_{20}$ ethylenically unsaturated organic dicarboxylic acid anhydride in the amount of about 0.1 to 20 moles of halogen per mole of said acid anhydride; and about 0.05 to 20,000 moles per mole of added halogen of a halogen-substituted-hydrocarbon solvent for said copolymer which is incapable by itself of incorporating halogen only, within said copolymer, said solvent containing a halogen selected from the group consisting of chlorine and bromine.

2. A process for modifying a copolymer of 85 to 99.5 wt. percent of a $C_4$ to $C_8$ isoolefin and 0.5 to 15 wt. percent of a $C_4$ to $C_{14}$ multiolefin which comprises: dissolving said copolymer in a halogen-substituted-hydrocarbon solvent which is incapable by itself of incorporating halogen only, within said copolymer, and halogenating the copolymer while dissolved in the solvent in the presence of a $C_4$ to $C_{20}$ ethylenically unsaturated organic dicarboxylic acid anhydride at a temperature of between about $-50°$ C. and $+200°$ C. for between about 3 minutes and 10 days with a halogenating agent capable by itself of incorporating halogen only, within said copolymer, said halogenating agent being present in an amount sufficient to combine about 0.1 to 30 wt. percent (based on copolymer) of halogen in said copolymer, said solvent being present in an amount of about 0.05 to 20,000 moles per mole of added halogen, said solvent containing a halogen selected from the group consisting of chlorine and bromine, and said carboxylic acid anhydride being present in an amount of about 0.1 to 20 moles per mole of added halogen.

3. A composition according to claim 1, containing about 0.1 to 20 wt. percent of combined chlorine.

4. A composition according to claim 1 in which the anhydride comprises maleic acid anhydride and the solvent is carbon tetrachloride.

5. A composition according to claim 1 in which the anhydride comprises chloromaleic acid anhydride.

6. A composition according to claim 1 in which the anhydride comprises citraconic acid anhydride.

7. A composition formed by reacting at a temperature of $-50°$ C. to $+200°$ C. a copolymer of 85 to 99.5 wt. percent of a $C_4$ to $C_8$ isoolefin and 0.5 to 15 wt. percent of a $C_4$ to $C_{14}$ multiolefin with chlorine in the presence of about 0.1 to 20 moles per mole of added chlorine of maleic acid anhydride and about 0.05 to 20,000 moles per mole of added chlorine of carbon tetrachloride.

8. A composition according to claim 5 which contains 2.0 to 15 wt. percent chlorine.

9. A process for modifying rubbery copolymers which comprises reacting at a temperature of $-50°$ C. to $+200°$ C. a copolymer of 85 to 99.5 wt. percent of a $C_4$ to $C_8$ isoolefin and 0.5 to 15 wt. percent of a $C_4$ to $C_{14}$ multiolefin with chlorine in the presence of about 0.1 to 20 moles per mole of added chlorine of maleic acid anhydride and about 0.05 to 20,000 moles per mole of added chlorine of carbon tetrachloride until said copolymer contains 0.1 to 30 wt. percent halogen.

References Cited in the file of this patent

UNITED STATES PATENTS

| | | |
|---|---|---|
| 2,142,980 | Huijser | Jan. 3, 1939 |
| 2,230,005 | Moser | Jan. 28, 1941 |
| 2,404,411 | Stephens et al. | July 23, 1946 |
| 2,623,256 | Sparks et al. | Apr. 7, 1953 |
| 2,757,218 | Dazzi | July 31, 1956 |
| 2,825,723 | Ballauf et al. | Mar. 4, 1958 |
| 2,831,839 | Canterino et al. | Apr. 22, 1958 |
| 2,844,502 | Paxton | July 22, 1958 |
| 2,844,567 | Dazzi | July 22, 1958 |
| 2,845,403 | Gunberg | July 29, 1958 |
| 2,948,709 | Kuntz | Aug. 9, 1960 |

FOREIGN PATENTS

| | | |
|---|---|---|
| 602,843 | Great Britain | June 3, 1948 |

OTHER REFERENCES

Schildknecht: Polymer Processes, Interscience (1956), pp. 23–27.